United States Patent [19]
Verbakel

[11] 3,879,803
[45] Apr. 29, 1975

[54] DEVICE FOR REMOVING THE INTERNAL PARTS FROM SLAUGHTERED POULTRY

[75] Inventor: Godefriedus Hendrikus Waltherus Verbakel, Helmond, Netherlands

[73] Assignee: Stork Amsterdam N.V., Amstelveen, Netherlands

[22] Filed: Jan. 5, 1972

[21] Appl. No.: 215,470

[30] Foreign Application Priority Data
Jan. 7, 1971  Netherlands ..................... 7100142

[52] U.S. Cl. .................................................. 17/11
[51] Int. Cl. ............................................. A22b 3/08
[58] Field of Search ........................................ 17/11

[56] References Cited
UNITED STATES PATENTS
3,555,593  1/1971  Scheier .................................. 17/11

*Primary Examiner*—Robert Peshock
*Attorney, Agent, or Firm*—Edmund M. Jaskiewicz

[57] ABSTRACT

A device for removing the internal parts from slaughtered poultry, comprising a supporting plate, a spatula and a rockable spoon the latter two to be moved into, and out of, the bird to loosen the internal parts and to withdraw them, said means being connected by brackets which are pivotally supported in a frame.

11 Claims, 11 Drawing Figures

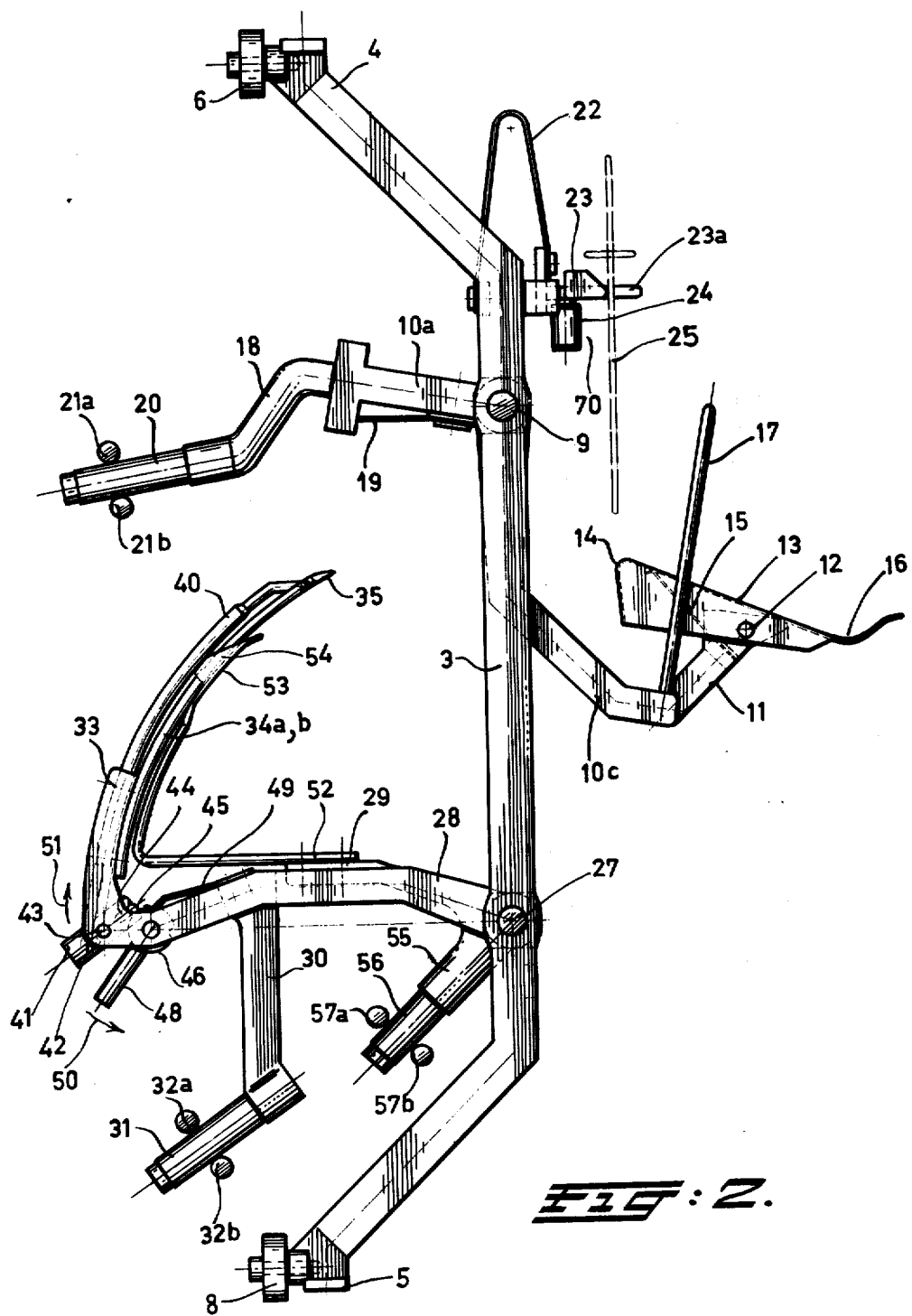

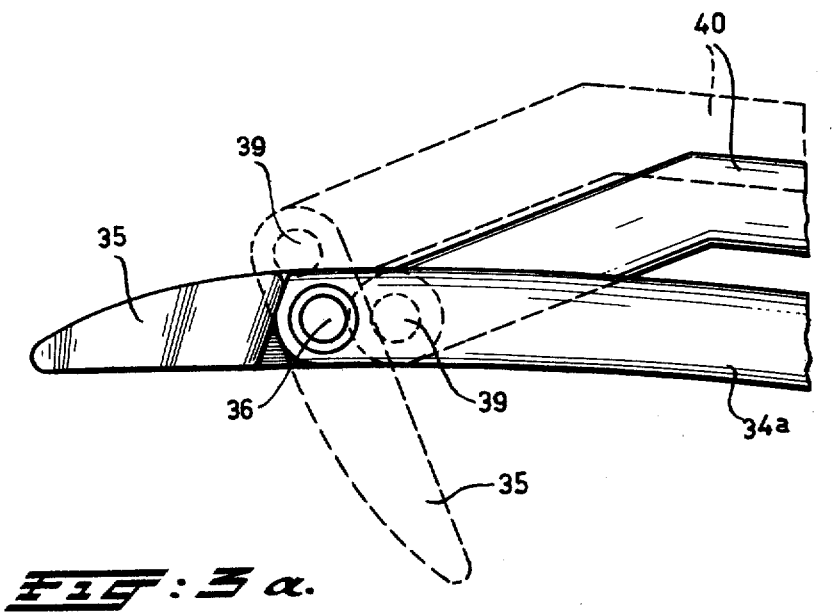
FIG: 3a.
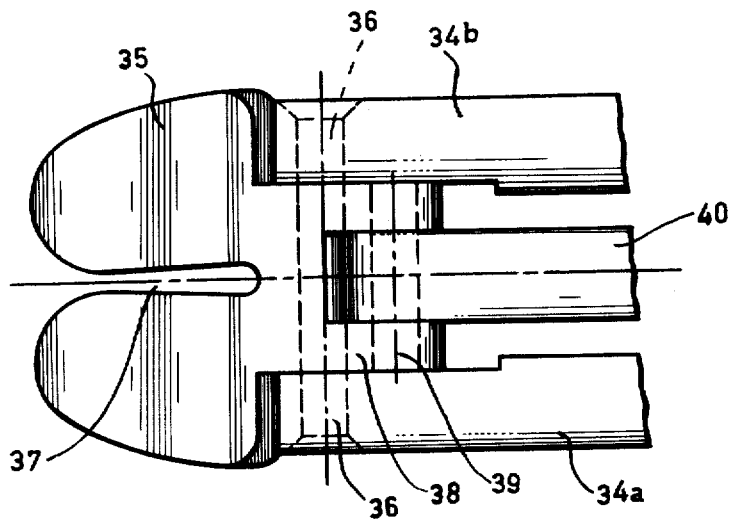
FIG: 3b.

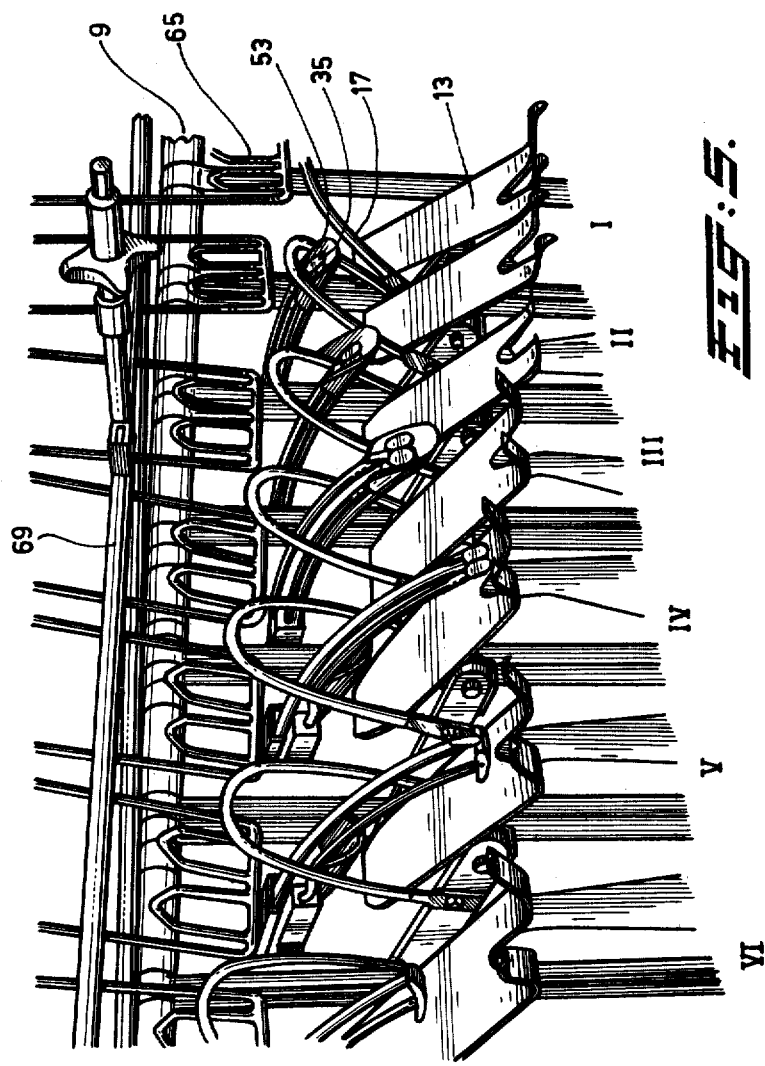

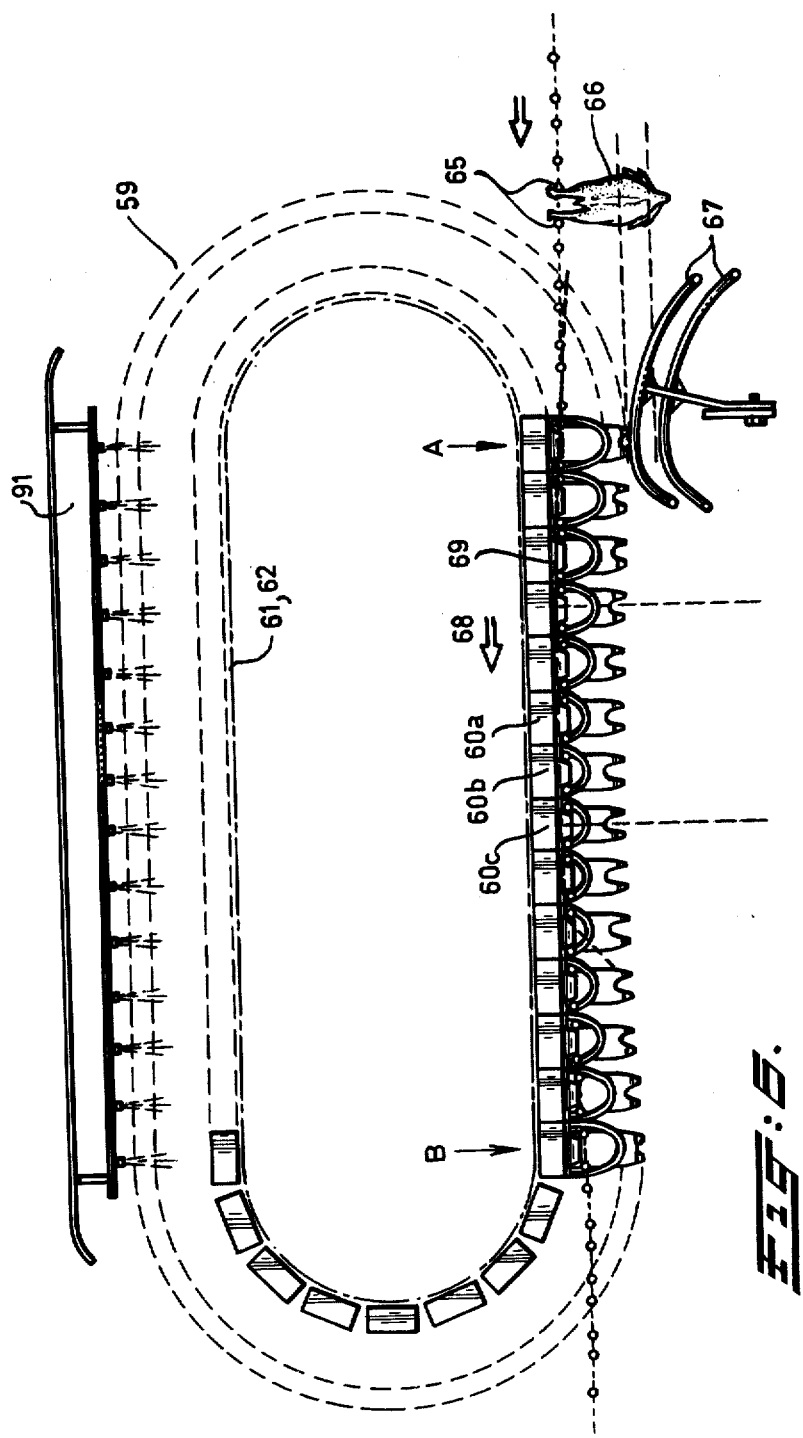

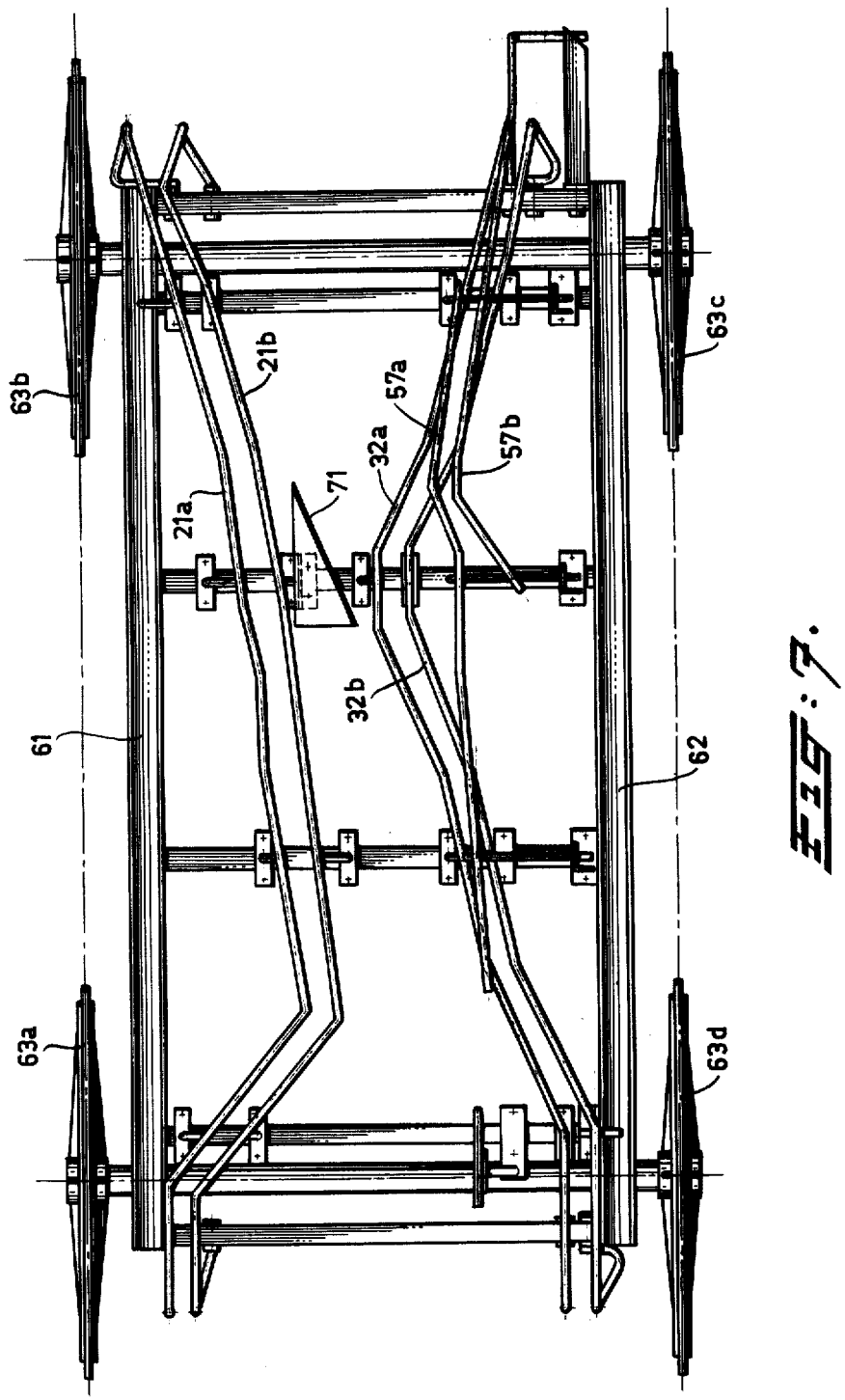

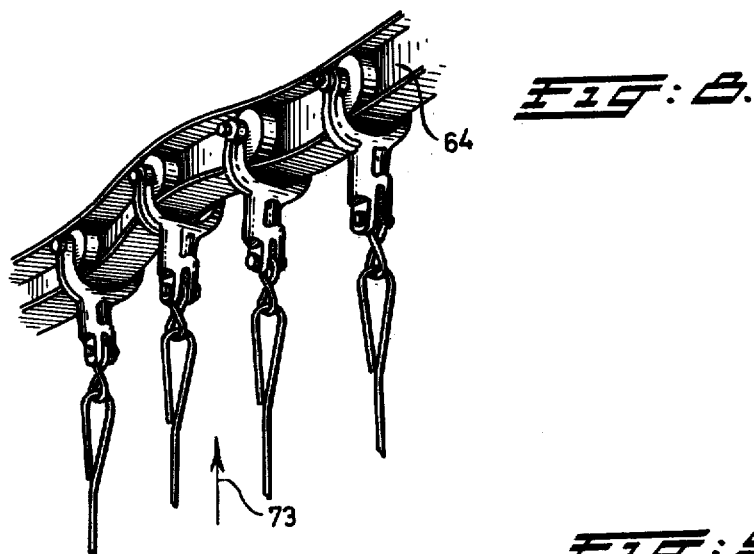
FIG: 8.
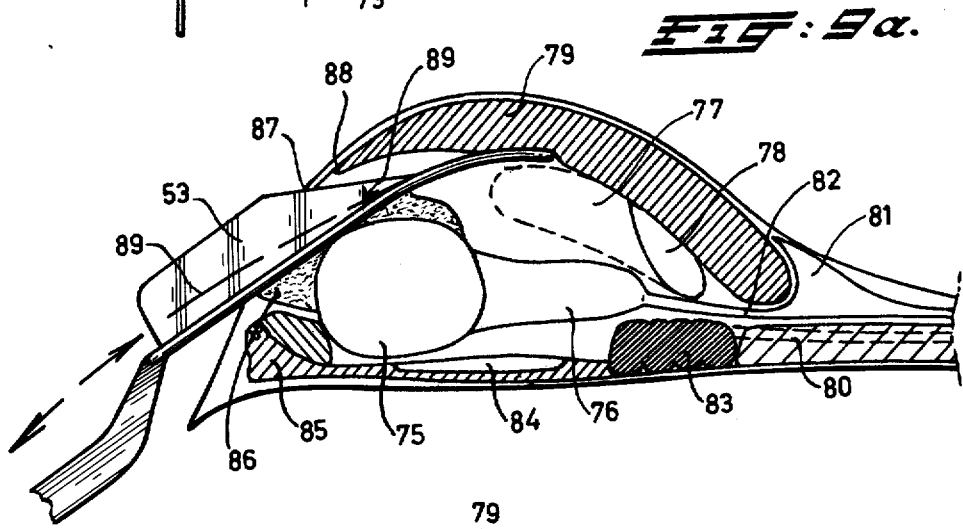
FIG: 9a.
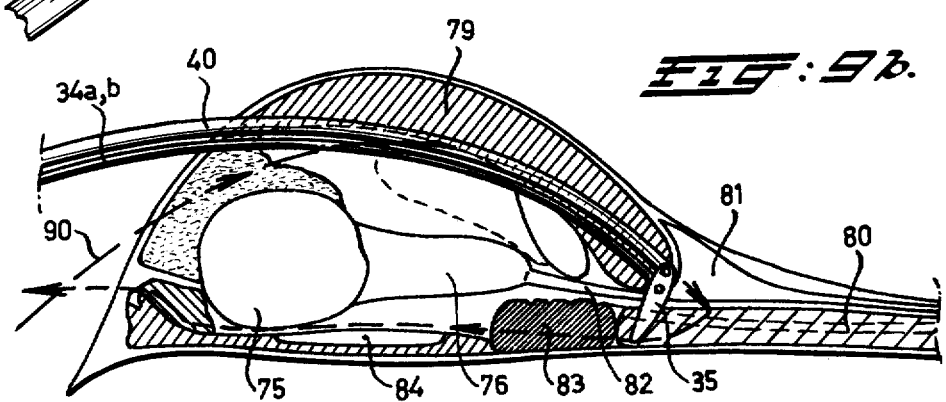
FIG: 9b.

DEVICE FOR REMOVING THE INTERNAL PARTS FROM SLAUGHTERED POULTRY

BACKGROUND OF THE INVENTION

My invention relates to a device for removing the internal parts from slaughtered poultry, comprising a supporting member for supporting the back of the bird which is advanced, hanging by its legs on a shackle, along a conveyor track, and further comprising a spoon-shaped member with a slot extending from its front edge and which can be moved along a curved path into the thorax of a bird and backwards.

Such a device is known. In this known device the poultry is supported in such a way that its back bears against a stationary vertical support, while the aim is to remove the internal parts from the body of the bird in one single movement by means of a single spade-shaped member.

This known device has the drawback that it cannot remove simultaneously the entrails and the gizzard. It furthermore appears that frequently the lungs are not removed, so that the device cannot operate without human supervision and personnel is required for retreating the treated poultry. A further drawback of the device is the fact that the bird hangs in a vertical position, whereby, when the gutting operation is not properly performed, the whole packet of intestines falls back into the bird and lands in the lower part of the thorax.

When during the operations of tearing loose the internal parts and the introduction of the spade the intestines are damaged there is a considerable risk of the carcass being defiled by enzymes and enterobacterias, impairing the keeping qualities of the product.

Furthermore this known device can cause damage to the liver. This means a considerable loss of money since the price per weight of liver is considerably higher than the price per weight of chicken meat.

SUMMARY OF THE INVENTION

It is an object of my invention to provide a device which is able to remove in a single operation all the entrails of the slaughtered bird with certainty, without causing damage thereto, in particular without damaging the intestines and the liver.

The device according to my invention is characterized by an oblong upright frame which supports for pivotal movement about substantially horizontal axes:

a first bracket of which a part which protrudes forwards from the frame, carries a supporting plate for the bird, a second bent bracket, supported at a second pivotal point, carrying a spatula at the free end, which can be swung into a position above the plate, a third bracket, supported at this pivotal point or in the vicinity thereof, the free end of which is slightly spaced up from the second bracket and which can describe a path substantially parallel therewith and carrying a spoon which can pivot downwards and which is coupled to an operating mechanism, and driving means, acting upon the brackets, which are constructed in such a way that the plate can be lifted, the spatula together with the spoon can be moved in an arc to above the plate and from the backside into the thorax of a bird supported by the plate, the spatula can be moved backwards, while the spoon can continue the forward movement over a short distance, the spoon can be pivoted downwards and then be moved backwards whilst taking along the entrails of the bird.

It has been found in practice that the device according to my invention does not cause damage to the entrails of the bird and surely removes all of them. Such a device can be incorporated into an endless belt production line in which the poultry is slaughtered and prepared for quickfreezing without human intervention.

Preferably the first bracket carries an upright U-shaped abutment strap spanning round the plate in the proximity of the rear end thereof, while the plate is preferably constructed in such a way that the front end thereof terminates into two rising supporting lips separated by a central longitudinal groove. The spatula is preferably provided with a curved front edge and delimited on either side by two flanges between which fits the spoon which is pivotally arranged between the ends of the two curved supporting rods and is pivotally connected to a driving rod, movable in the longitudinal direction and coupled to a driving mechanism.

In order to obtain a proper adaptation to birds of different sizes the plate is secured to the front part of the first bracket in such a way that it is capable of tilting through a limited angle and in opposition to spring action, while in the control mechanism thereof there is a limited clearance to be absorbed in opposition to spring pressure.

A very simple and nevertheless strong structure is obtained when the frame is constructed from two uprights, which on a part of their length are parallel, and between which in the proximity of the upper end the first bracket is pivotally secured, while thereunder, rotatable about a common pivotal point, are provided the forked V-shaped second bracket and, between the first and the second bracket, the third V-shaped bracket which carries the spoon.

The bracket for the spoon and the driving mechanism thereof are preferably constructed in such a way that the two supporting rods carrying the spoon are connected to the third bracket, made up from two spaced parts with a rotatable cylindrical driving member there between, which is provided with control cam, the control cam which fits in an elongated recess in a rocker, the latter being rotatable supported between these parts and being coupled to the driving rod for the spoon.

An installation for removing in a continuous process the entrails from slaughtered poultry, and particularly adapted to cooperate with a conveyor track along which the birds, hanging by their legs, are advanced, comprises according to my invention a number of mobile units according of the kind as described above, which are placed in juxtaposition along a closed path which extends over a part of its length along the conveyor track and which units can be moved synchronously with the conveyor track, while the first, the second and the third bracket of each unit carry protruding control members cooperating with a number of control rods, fixedly arranged along a part of the path, by means of which the desired movements of said brackets are controlled.

The provision of control cams on the brackets, cooperating with stationary control rods arranged along a part of the path makes it possible to adjust the various movements of the parts of each unit to each other and to bring them about.

When a shackle, carrying a bird, is coupled to a unit of the installation the various movable members of this unit will be forced, during their travel along the conveyor track, to perform the movements resulting in the removal of the internal parts of the bird.

The coupling of a shackle with a bird to a unit is preferably effected by providing on each unit in the proximity of the upper end, a forwardly protruding nose which fits into a shackle which supports the poultry in order to couple this to a unit concerned, while along that part of the path where spatula and spoon are introduced into the bird a horizontal push rod, lying between the nose and the path and under the level of the noses is placed, the cooperation with the push rod results in that the shackle with the bird is forced away in such a way that it assumes an oblique position so that the bird is pushed upwards against the supporting strap and a correct introduction of the spatula and the spoon is ensured.

In order to enhance this effect the conveyor track for the poultry lies over a part of its length, which extends along the installation, at a higher level than the rest of the track.

SUMMARY OF THE DRAWINGS

FIG. 2 is a side elevation of such a unit;

FIG. 3a and 3b show in side elevation, plan view, respectively the spoon with part of the spoonholder and the driving rod for the spoon;

FIG. 5 is a perspective view of a part of a number of treatment units according to the invention belonging to a complete installation;

FIG. 6 is a schematic plan view of such an installation diagrammatically represented;

FIG. 7 shows schematically a front view of such an installation with the control rods;

FIG. 8 the conveyor track for the poultry with an elevated part;

FIG. 9a and 9b show in outline a cross section of a slaughtered chicken with an indication of the path as followed by spatula and spoon within the bird.

DESCRIPTION OF A PREFERRED EMBODIMENT

Figure 1:
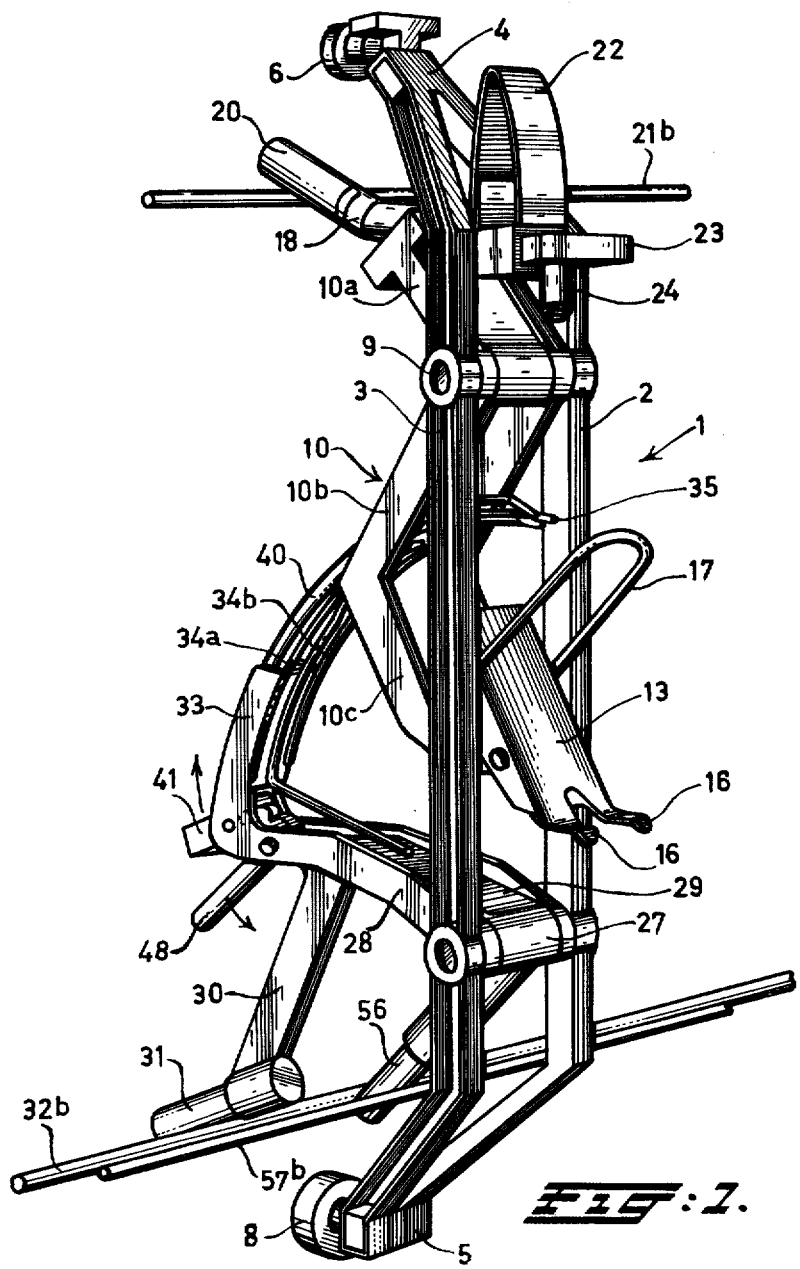
FIG. 1 is a perspective view of a unit for treating poultry according to my invention.

The device shown in the FIGS. 1 and 2, being a unit for removing the intestines of a bird, consists of a frame 1 which is constructed from two uprights which for a part of their length are parallel. At their upper ends 4 these uprights 2, 3 are interconnected at the location 4, at their lower end they are likewise interconnected notably at the location 5. The connecting piece 4 carries the guide roller 6; the connecting piece 5 carries the guide roller 8. By means of the roller 6 and 8 the treatment unit, united with a number of analogous units to constitute together a complete plant, can be guided along a closed conveyor path.

Between the uprights 2 and 3 is provided a first bearing 9 around which a first bracket 10 can rotate. This bracket is more or less Z-shaped, and consists of a part 10a, protruding backwards from the bearing 9, and a part 10b which makes an angle with this part 10a and a part 10c, directed forwards at an obtuse angle, of which the end is connected with an upright supporting piece 11. The latter supports, via the pivotal point 12, the plate 13 which can tilt through a limited angle while the back part 14 thereof is pressed upwardly by the leaf spring 15. The plate 13 which merges at the front part into two upwards bent supporting lips 16, which are separated by a groove, is embraced by a U-shaped strap 17 which is secured to the end of the part 10c of the bracket. This bracket 10 cooperates with the control arm 18 the end of which can likewise rotate around the pivot point 9 and which can move through a small angle with respect to the part 10a of the bracket 10 in opposition to a spring 19. The control arm 18 ends in a cylindrical control cam 20 which cooperates with two oblong control rods 21a, 21b as will be described later on.

Above the pivot point 9 the frame carries a V-shaped leaf spring 22 with at its free end the cam 23 with the extension 23a and a cylindrical control cam 24; the cam 23 with the extension 23a cooperates with the schematically represented shackle 25, which supports a bird to be treated, purpose and effect of these members will be discussed hereafter.

Under the pivot point 9 is a second pivot point 27 around which a second forked bracket 28 and a third bracket 29 lying within the second bracket, can rotate. The V-shaped bracket 28 carries, at some distance away from the pivot point 27, the control arm 30 with the cylindrical control cam 31 which cooperates with the bent control rods 32a, 32b; the second leg 33 carries two bent supporting rods 34a, 34b, between the ends of which a spoon 35 is held in such a way that it is rotatable about the shaft 36. FIG. 3a and 3b show on enlarged scale the spoon 35 and its support. The spoon 35 has a central groove 37 and is pivotally coupled to the driving rod 40, while the extension 38 of the spoon can pivot around the shaft 39. The driving rod 40 is slidably guided in the bracket 33 and pivoted connected at the location 42, to a rocker 41 accommodated between the two parts of the bracket 33; this rocker rotates around the shaft 43 and the slot 44, extending longitudinally in the rocker, cooperates with a cam 45 on the cylindrical control member 46 which carries a cylindrical control cam 48. The control cam 46 is lockable in two positions by means of a locking spring 49. A movement of the control cam 48 in the direction of the arrow 50 results in that the pivot point 42 moves in the direction of the arrow 51, whereby the control rod 40 moves forward and the spoon 35 is brought from the position indicated by full lines in FIG. 3a in the position represented by dotted lines.

The bracket 29 carries the likewise bent, V-shaped, supporting rod 52 carrying at its end the spatula 53; with the upright sides 54. Due to the fact that the pivot points of the brackets 28 and 29 coincide at the location 27 the spoon 35 and the spatula 53 will describe parallel curved paths. The movement of the bracket 29 and the spatula 53 is brought about by the control arm 55 carrying the cylindrical control cam 56 which cooperates with two bent control rods 57a and 57b. It should be noted that in FIG. 1 only parts of the length of the control rods 21b, 32b and 57b are represented for the sake of clarity.

Figure 4:
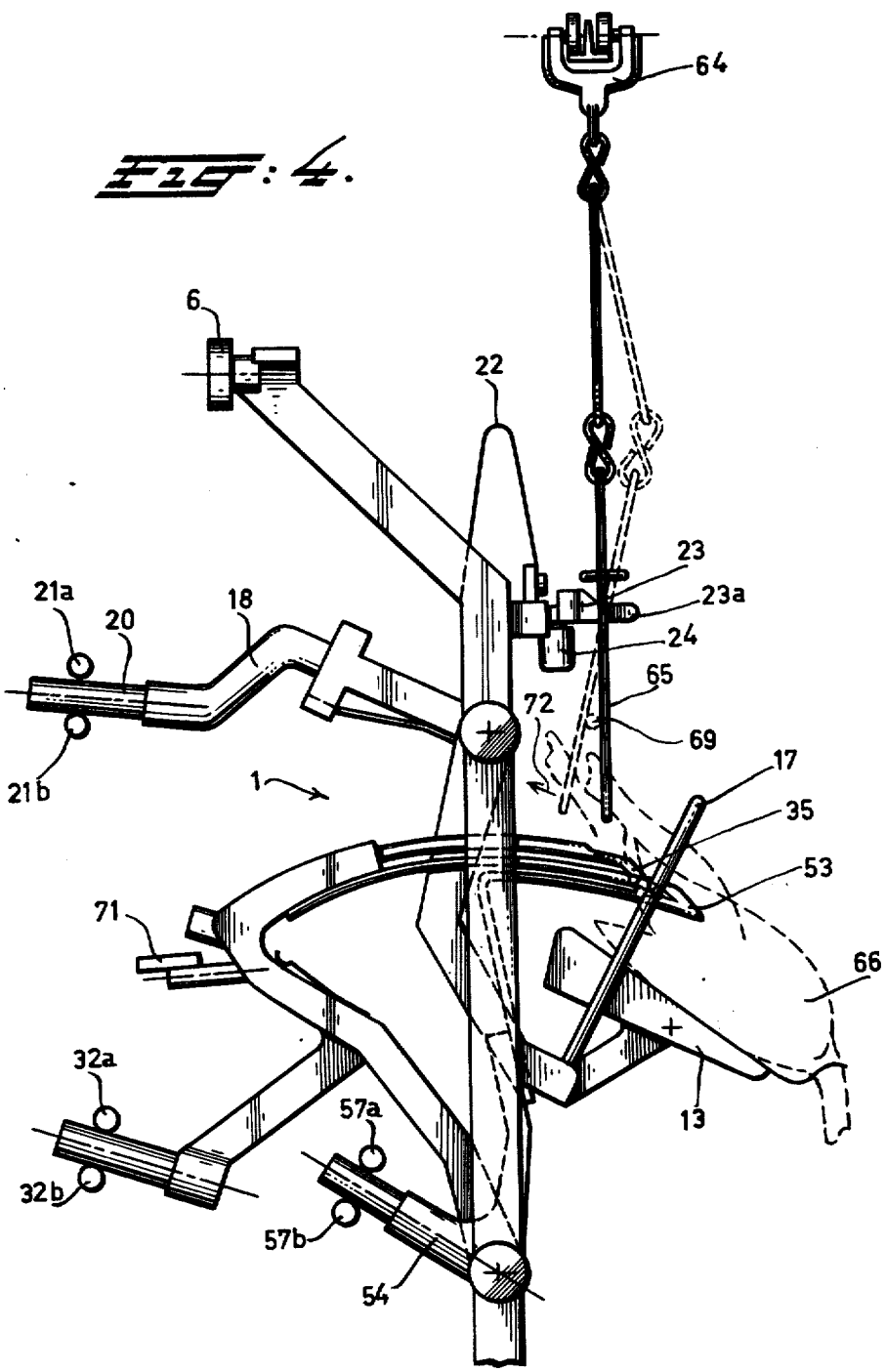
FIG. 4 is a side elevation in conformity with FIG. 2 the various parts being shown in another position.

During the operation of removing the entrails the bird bears on the plate 13, its neck being directed in the direction of the rising lips 16 and its legs being fastened to the shackle 25. (Vide FIG. 4). The legs of the bird span round the supporting strap 17 and through an appropriate cut, made beforehand in the back part of the bird the spatula 53 and the spoon 35 are introduced into the bird. The spoon 35, after having been turned downwardly, removes during the return movement the complete entrails, as will be described later on.

A unit as described above, is preferably combined with a number of similar units to a complete installation which is arranged alongside a conveyor track for slaughtered poultry that is advanced hanging by its legs on the usual shackles. FIG. 6 shows schematically a plan view of such a device; the schematically shown units 60a, 60b etc. are all of the kind as described above the guide rollers 6, 8 respectively thereof bear in curved upper-, lower paths 61, 62, respectively (vide FIG. 7) and the units are moved along these paths by means of chains (not shown) slung around the guide wheels 63a, b, c, d and coupled to the upper-, lower end 4, 5 respectively. The whole is driven in such a way that the circumferential velocity is equal to the velocity with which the conveyor track 64 with the shackles 65 with the birds 66 suspended therefrom move along the installation 59.

Two guide rods 67 are provided at the location where the conveyor path 64 approaches the installation 59, while in the direction of movement (arrow 68) following thereafter a further guide rod 69 is provided.

When the poultry hanging from the shackles, enters the installation the nose 23a of a unit 60 comes to lie in the open part of a shackle 65 whereby the latter is coupled to a unit. This is facilitated by the fact that the control cam 24 (see FIG. 1), cooperating with a control rod (not shown) during this phase is temporarily pushed back, against the action of the leaf spring 22, whereupon, after the cam 24 rebounds, the nose 23a falls entirely within the shackle. The shackle 65 and the bird 66 hanging therefrom are now coupled to a unit 60 of the installation 59.

It is essential for the invention that the entrails are separated along the breast side of the bird and that the bird during the operation for removal of the intestines is supported in a more or less horizontal position. On removing the entrails no damage is done thereto nor is the rest of the bird damaged, while furthermore the entrails cannot fall back into the bird. With the exception of a short period, during the introduction of the spatula, the bird is during the complete treatment supported on the plate 13 the rising lips of which serve to support bigger birds on their neck side.

The control rods 21a, 21b, 32a, 32b, 57a, 57b achieve that during the movement of a unit 60 in the direction of the arrow 68 along the installation the spatula and the spoon can perform independently of each other the required movements. The plate moves upwards and downwards, the spatula moves with a velocity differing from that of the spoon forwards and backwards and the movement of the spoon 35 too is independently controlled. The cylindrical control cam 48 controls the movement by which the spoon is swung in position.

FIG. 7 shows a schematic view of the plant, without treatment units, with the control rods 21a, 21b, 32a, 32b, 57a, 57b. The inclined control surface 71 cooperates with the control cam 48 and controls the movement by which the spoon 35 is swung downwardly. The movements of the various parts of a unit follow from the curvature of the control rods. These movements are the following: when a unit 60 has arrived in the position indicated in FIG. 6 by A and the coupling with a particular shackle 65 with a bird 66 as described hereinbefore, has been achieved the plate 13 has already performed a part of the upwards directed movement (control cam 20 has moved downwards), while spatula and spoon have started their movement in the direction of the plate. Initially spatula 53 and spoon 35 move together towards the plate 13, the spatula 53 ahead of the spoon 35, and move simultaneously into the bird. In this phase of the treatment the shackle 65 strikes the curved push rod 69 so that, since the shackle 65 bears against the cam 23, the lower end of the shackle will move in the direction of the arrow 72, the shackle assumes the position represented in dotted lines in FIG. 4 and the bird, hanging on the shackle, is pulled upwards. The legs of the bird enclose the strap 17 and it is ensured that the spatula and spoon penetrate into the bird and do not pass over same. Furthermore the conveyor path 64 is in this area elevated on a part of its length in a way shown in FIG. 8, so that the shackle 65 on a small part of its travel is pulled upwards in the direction of the arrow 73.

FIG. 5 shows in a perspective view the various relative positions of the plate 13, the spatula 53 and the spoon 35 of various units. Initially (phases I, II and III), the spatula 53 and the spoon 35 advance while the spoon 35 slightly lags with respect to the spatula 53; the spatula 53 separates the liver and the heart from the breast side, thereupon the spatula 53 (phase IV) moves fast backwards, the spoon 35 continuing its forward movement at a faster rate, which is caused by the rising part of the control rods 32a, 32b and the downwards inclined part of the control rods 57a, 57b. At the end of the stroke of the spoon the control cam 31 comes into contact with the control surface 71 so that the spoon is pivoted downwards (phase V), the two parts separated by the slit 17 surround the connection 82 between the crop and the stomach With the next return stroke (phase VI) all internal organs of the bird are removed in a single operation from the bird's body. At the location B the shackles 65 loosen themselves one by one from the respective units to which they were coupled, the shackles with the birds move further along the conveyor path 64 to other treatment stations, while the units follow their path along the installation. At the rear part of the plant is a rinsing device 91 where the treatment units are thoroughly cleaned with water sprayed over them. At the rear part of the installation are other control rods (not shown) which serve to return the various members of each unit to their initial position.

FIG. 9a and 9b both show longitudinal cross-sections through a chicken in which the path of spatula and spoon in the chicken is shown. In FIG. 9a the broken line 89 shows the path of the spatula 53; in FIG. 9b the broken line 90 shows the path of the spoon 35. The figures show the stomach 75, 76, livers 77, heart 78, breast 79, wind pipe 80, crop 81, the connection between the crop and the stomach 82, the lungs 83, kidneys 84, the pelvis 85, and the fat mass 86.

The birds of which the internal parts are to be removed are already provided with an appropriate cut in the hind part of the body when they approach the installation 59; through this cut the spatula 53 is introduced in the way as shown in FIG. 9a. The spatula 53 separates the heart 78 and the livers 77 from the breast 79; after the spatula has been retracted the spoon 35 follows the path of the spatula pushing the fore part of the breastbone upwards; at the end of its travel the spoon is pivoted downwardly and assumes then the position as shown in FIG. 9b. On its return stroke it takes with it the above mentioned internal parts; as the crop 81 is connected to the stomach 76 by the connection 82 the crop 81 is removed too.

What I claim is:

1. A device for eviscerating poultry comprising an upright frame having first and second horizontal pivotal axes thereon and one end of said frame being positionable adjacent a bird suspended by its legs, a first bracket pivotally mounted on said first pivotal axis and having one end directed toward said frame one side, a supporting plate for a bird mounted on said one end of said first bracket, a second bracket pivotally mounted on or adjacent to said second pivotal axis and having one end directed toward said frame one side, a spatula mounted on said second bracket one end and being pivotable along an arcuate path to a position over said supporting plate, a third bracket pivotally mounted on or adjacent to said second pivotal axis and having one end movable along a second arcuate path above said second bracket, said arcuate paths having the same curvature, a spoon pivotally mounted on said third bracket one end and pivotable about an axis perpendicular to the path of movement of said spoon, and bracket actuating means for lifting said supporting plate and for moving said spatula and spoon together in an arc above said lifted plate and for withdrawing the spatula while continuing the forward movement of the spoon and for pivoting the spoon downwardly and for withdrawing the downwardly turned spoon so as to carry the entrails of the bird outwardly thereof.

2. A device according to claim 1, wherein the first bracket carries an upright U-shaped abutment strap spanning round the plate in the proximity of the rear end thereof.

3. A device according to claim 1, wherein the plate at the front part thereof terminates into two rising supporting lips separated by a central longitudinal groove.

4. A device according to claim 1 wherein said spatula has a curved front edge and two side flanges between which is disposed said spoon.

5. A device according to claim 1 wherein said supporting plate is pivotally mounted to the front part of the first bracket in such a way that it is capable of tilting through a limited angle, and spring means acting against said plate in opposition to said tilting.

6. A device according to claim 1 wherein the frame comprises two uprights, which along a part of their length are parallel, and between which in the proximity of the upper end, the first bracket is pivotally mounted, while thereunder, rotatable about a common pivotal axis, are provided the forked, V-shaped, second bracket and, between the first and the second bracket, the third V-shaped bracket which carries the spoon.

7. A device according to claim 1 and comprising a pair of curved supporting rods attached to said third bracket and said spoon being pivotally mounted therebetween, a driving rod connected to said spoon and movable longitudinally, and a driving mechanism coupled to said driving rod.

8. A device according to claim 7 wherein said third bracket comprises two spaced parts with a rotatable cylindrical driving member there between, a control cam on said driving member, a rocker having an elongated recess within which is received said control cam, said rocker being rotatably supported between these parts and being coupled to the driving rod for the spoon.

9. An installation for eviscerating poultry, and adapted to cooperate with a conveyor track along which the birds are advanced, hanging by their legs, and comprising a plurality of units according to Claim 1 placed in juxtaposition along a closed path which extends over a part of its length along the conveyor track, said units being movable synchronously with the conveyor track, the first, the second and the third bracket of each unit having protruding control members cooperating with a number of control rods fixedly arranged along a part of the path by means of which said brackets are actuated.

10. An installation according to claim 9, wherein each unit carries, in the proximity of the upper end, a forwardly protruding nose, a shackle which supports the poultry and lockingly engageable with said nose to couple the shackle to a unit, a horizontal push rod, lying between the nose and the path, and under the level of the noses is placed along that part of the path where the spatula and the spoon of a unit are introduced into a bird.

11. An installation according to claim 10, wherein that portion of the conveyor track for the poultry which extends along an installation is positioned at a higher level than the rest of the track.

* * * * *